INVENTORS
John R. Cressey &
Charles E. Cote

BY [signature]
[signature]
ATTORNEYS

INVENTORS
John R. Cressey &
Charles E. Cote

BY

ATTORNEYS

United States Patent Office 3,437,874
Patented Apr. 8, 1969

3,437,874
DISPLAY FOR BINARY CHARACTERS

John R. Cressey, Hyattsville, and Charles E. Cote, Riverdale, Md., assignors to the United States of America as represented by the Administrator of the National Aeronautics and Space Administration Filed Feb. 28, 1967, Ser. No. 619,908
Int. Cl. H01j 29/70
U.S. Cl. 315—24 4 Claims

ABSTRACT OF THE DISCLOSURE

Disclosed is a CRT system for displaying ones and zeros in a binary wave train. The CRT beam is discretely stepped to a plurality of horizontal and vertical discrete locations with stair step generators. At each location a one or zero is written utilizing Lissajous pattern techniques. If the binary signal being monitored is a zero, orthogonal sinusoidal voltages are applied to a particular discrete location on the CRT face while a binary one signal causes only one of the sinusoids to be applied to the CRT.

The invention disclosed herein was made by employees of the United States Government and may be manufactured and used by or for the Government for governmental purposes without the payment of any royalties thereon or therefor.

The present invention relates generally to data display systems and more particularly to a system for displaying binary one and zero indications at a plurality of discrete locations where in a pair of sinusoidal voltages displaced 90° from each other selectively deflect a display spot image.

The growing complexity of modern digital telemetry systems has produced a requirement for improved systems for monitoring large quantities of digital information during the design and testing phases of many programs. In particular, a problem area has existed where real-time system operation is concerned.

Prior art digital display systems require, in many instances, a display light and memory device for each data bit displayed or presented. These prior art devices are inherently slow and necessitate data storage prior to read-out of waveforms having relatively rapid bit rates. Other digital display techniques employed in the prior art utilize oscilloscope, cathode ray tube (CRT) displays wherein data is presented in non-return-to-zero (NRZ) wave shape form rather than as a plurality of numerals. Where display lights and print out systems are utilized to indicate binary wave train bits, cost is frequently a prohibiting factor and data analysis time is extensive, whereby adaptation to real time analysis is extremely difficult. Those systems wherein waveforms of NRZ data are displayed directly on a CRT have the disadvantage that analysis on a bit-by-bit or word-by-word basis is difficult to discern since the ones and zeroes are not easily aligned by the human eye.

According to the present invention, a display system is provided wherein the binary ones and zeros of a wave train are displayed directly as numerical ones and zeros on the face of a display. Briefly, the display is derived by positioning a CRT beam at a plurality of discrete horizontal locations along a plurality of vertically disposed lines. At each position, a one or zero is written onto the face of the CRT by utilizing Lissajou pattern techniques. When the signal has a binary one value, a sinusoid scans the cathode ray beam a number of times in the vertical direction at a discrete location. When the wave train corresponding with another discrete position has a binary zero value, the cathode ray beam is deflected both horizontally and vertically with voltages having the same frequency but 90° displaced from each other. By scanning the cathode ray beam a number of times at each discrete position, adequate screen brightness for visual or photographic read out is attained.

It is, accordingly, an object of the present invention to provide a new and improved system for monitoring binary wave trains.

It is another object of the present invention to provide a system for displaying binary ones and zeros in numerical form in response to corresponding signals in a binary wave train.

Still an additional object of the present invention is to provide a system for displaying numerical binary ones and zeroes indicative of bits in a wave train, which system is less complex, less expensive and has higher speed capabilities than prior art systems.

Still another object of the present invention is to provide a system for displaying bright numerical characters indicative of the levels of a binary bit wave train.

Yet another object of the present invention is to provide a system for displaying binary bits in a wave train with a cathode ray tube displaying having ones and zeros selectively written by Lissajous figure techniques.

The above and still further objects, features and advantages of the present invention will become apparent upon consideration of the following detailed description of one specific embodiment thereof, especially when taken in conjunction with the accompanying drawings, wherein.

Figure 1:
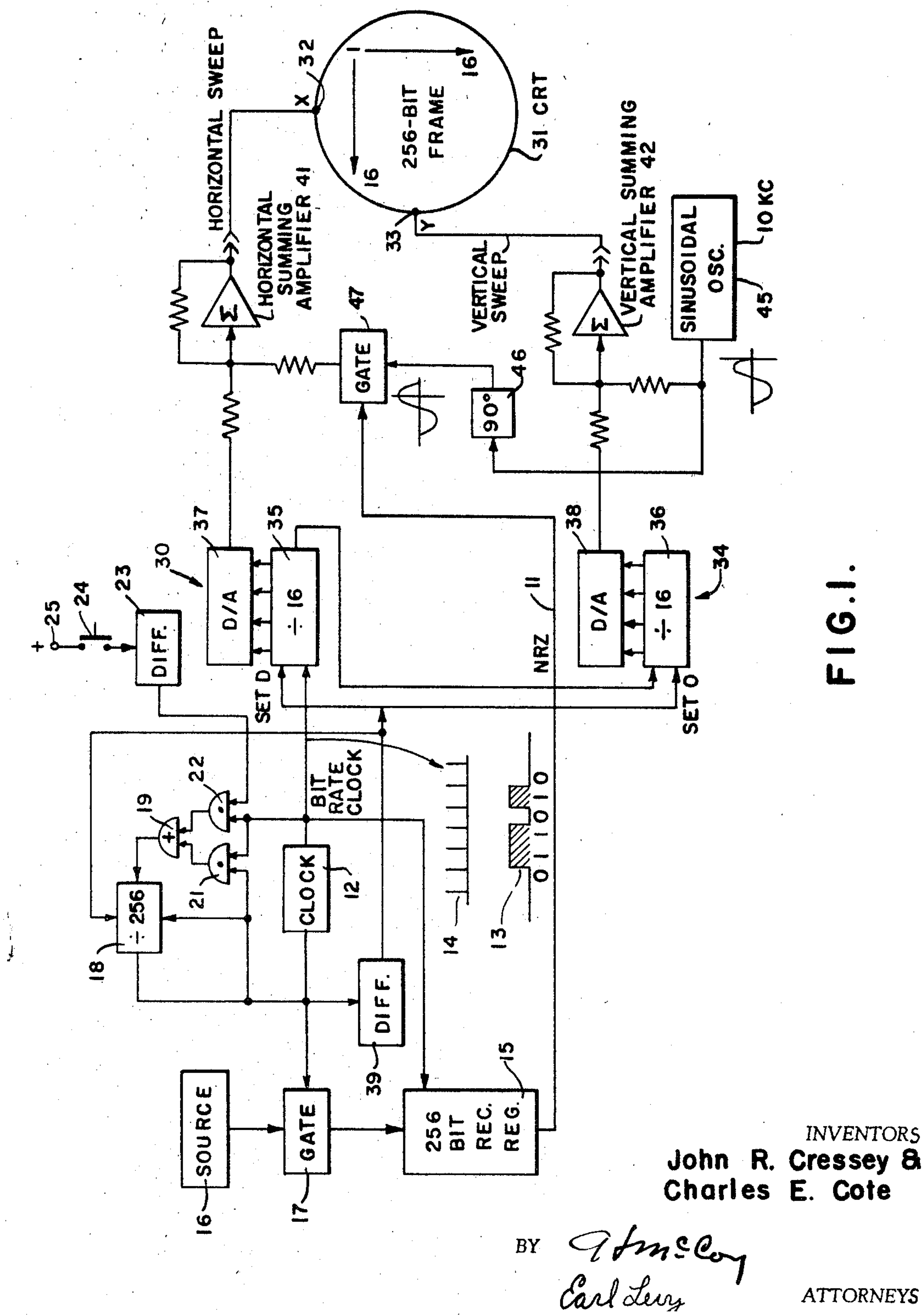
FIGURE 1 is a block diagram of the preferred embodiment of the present invention.

Reference is now made to FIGURE 1 of the drawings wherein a source of bi-level binary non-return-to-zero (NRZ) signal is applied to lead 11 from any suitable source. The non-return-to-zero serial wave train 13 on lead 11 has a repetition rate of 1 kc., with transitions occurring synchronously with pulses from 1 kc. clock source 12. An exemplary wave train having binary sequence of 011010 is illustrated by waveform 13 while synchronous pulses from source 12 are indicated by waveform 14.

The non-return-to-zero serial wave train 13 derived on lead 11 is generated as a recurring signal having 256 bits in each recurring frame. The recurring signal is derived from 256 bit recirculating register 15 that is coupled to binary signal source 16 through gate 17. Gate 17 is opened for a time period required to feed 256 serial bits from source 16 into register 15 and is thereafter closed.

Control of gate 17 is via divide by 256 frequency divider 18, supplied with pulses from clock source 12 through OR gate 19, as well as AND gates 21 and 22. AND gate 22 is also responsive to the output of differentiator 23 that derives a short duration, positive going pulse in response to closure of manually activated spring biased switch 24 that couples the positive DC potential at terminal 25 to the differentiator input. The pulse from differentiator 23 has a sufficient duration to be in time coincidence with one and only one pulse from clock source 12, whereby a single positive pulse is coupled to the input of frequency divider 18 from AND gate 22 and OR gate 19 in response to closing of switch 24.

In response to the pulse supplied to divider 18 through

AND gate 22, the output of divider 18 is switched from a negative to a positive voltage. The positive output voltage of frequency divider 18 is coupled to the input of AND gate 21, whereby pulses from clock source 12 are coupled to the input of divider 18. The output of divider 18 remains at a positive level while 255 pulses are supplied through AND gate 21 by clock 12.

In response to the 255th pulse supplied by clock 12 through AND gate 21, the output of divider 18 reverts to a zero voltage. The trailing edge of the divider positive output pulse activates differentiator 39 to generate a negative pulse. The negative output pulse of differentiator 39 is fed back to reset input 118 of divider 18 to reset the divider to a count of 255. Thereby the next activation of switch 24 brings divider 18 to the zero state. Hence, a positive voltage is derived at the output of divider 18 for a duration equal to 256 clock pulses subsequent to each activation of switch 24 and the divider output remains at zero voltage level at all other times.

The 256 clock pulse interval positive voltage derived from divider 18 opens gate 17, whereby 256 serial non-return-to-zero pulses from source 18 are coupled to register 15. Register 15 is sequentially advanced under the control of clock 12, whereby wave train 13 repeats itself for every 256 pulses from clock source 12 and a repeating 256 bit frame is derived until the next activation of switch 24.

Numerical analysis of the binary signals in wave train 13 is accomplished with cathode ray tube 31 having an unblanked cathode ray beam and orthogonal deflection plates responsive to the CRT X and Y deflection input terminals 32 and 33. Each binary bit in wave train 13 is numerically displayed on the face of cathode ray tube 31 at a different discrete position, 16 discrete positions being defined along each of the 16 horizontal lines of data written onto the CRT face. Positioning the spot image of the unblanked cathode ray beam of CRT 31 at the 256 discrete positions on the CRT face is accomplished with a pair of stair step generators 30 and 34.

Stair step generators 30 and 34 comprise divide by 16 frequency dividers 35 and 36 which respectively feed digital-to-analog converters 37 and 38. Frequency divider 35 is directly coupled with pulses from clock source 12 while the input of frequency divider 36 is responsive to the output of divider 35. Thereby, the count in divider 35 is advanced in response to each pulse from clock 12 while the count in divider 36 is advanced in response to each transition in the last stage of counter 35, which transition occurs simultaneously with every 16th pulse from clock 12. Digital-to-analog converters 37 and 38 respond to the 16 different outputs of dividers 35 and 36 to derive stair step voltages having 16 discrete steps. The output of converter 37 is returned to the bottom step simultaneously with each step advance at the output of converter 38. Similarly, the output of converter 38 is returned to the lowest step after a complete frame of 256 clock pulses from source 12 has been derived.

To reset counters 35 and 36 to the zero state synchronously with the derivation of the first pulse in a 256 bit frame being derived from register 15, the output of divider 18 is coupled to reset-to-zero inputs of the counters via differentiator 39. Differentiator 39 responds to the trailing edge of the divider output, to feed a negative short duration pulse to the set-to-zero inputs of dividers 35 and 36, whereby both dividers are set to zero. In response to both dividers 35 and 36 being set to zero, converters 37 and 38 derive voltages commensurate with the first bit location in the frame being analyzed. Converters 37 and 38 respectively drive the X and Y deflection inputs 32 and 33 of CRT 31 through summing amplifiers 41 and 42, respectively.

Figure 2:
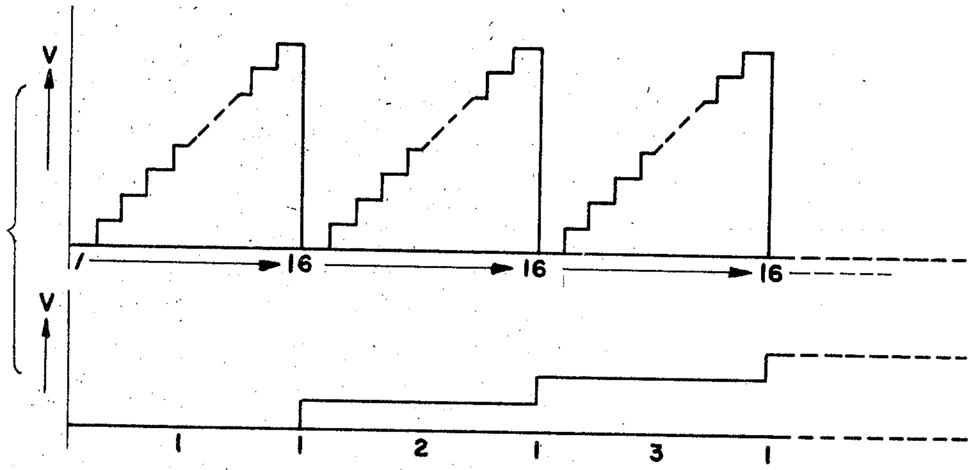
FIGURE 2 is a series of waveforms indicating timing voltages derived with the circuit of FIGURE 1.

With the outputs of converters 37 and 38 at the lowest step, as indicated by the upper waveform of FIGURE 2, the cathode ray beam of CRT 31 is positioned at the location indicated by the numeral 1 on the face of the CRT screen. In response to the second pulse from clock source 12, counter 35 is advanced to its second state and converter 37 derives an analog voltage that has a voltage equal to the second step of the upper waveform of FIGURE 2. Simultaneously, the output of converter 38 remains at the lowest step, as indicated by the lower waveform of FIGURE 2. With the outputs of converters 37 and 38 at the second and lowest steps, respectively, the unblanked cathode ray beam of CRT 31 is translated one step to the left and remains on the top line along the display defined by the face of CRT 31. In a similar manner, the CRT cathode ray beam is discretely stepped along 16 places on the top line of the display.

In response to the 17th pulse from clock source 12, divider 35 is returned to the zero state while divider 36 is advanced to the first state. In response to the zero state of divider 35, converter 37 again derives an output equal to the lowest step, returning the beam of CRT 31 to the extreme right side of the display. Simultaneously, the output of converter 38 is advanced to the second step, indicated by the lower waveform of FIGURE 2, and the cathode ray beam is deflected downwardly to the second line of the display. In a similar manner, each bit position for the remaining discrete horizontal and vertical locations on the faces of CRT 31 is illuminated by the cathode ray beam.

To write the numerical data at each of the 256 positions on the face of CRT 31 in response to the binary zeros and ones in wave train 13, 10 kc. sinusoidal oscillator 45 is connected to one input of summing amplifier 42. The 10 kc. output of oscillator 45 is phase advanced or retarded 90° in phase shifter 46, the output of which is selectively gated to the input of summing amplifier 41 through gate 47. Gate 47 is closed whenever a positive binary one signal occurs in the NRZ wave train, whereby the spot image of the CRT is deflected in a straight, vertical line that is written onto the face of CRT 31 at the space defined by the output voltage of converter 37. Gate 47 is opened, i.e., passes the sinusoidal output of phase shifter 46 to the input of amplifier 41, throughout the duration of each binary zero in wave train 13 so that a Lissajous pattern in the form of a numerical zero is selectively written by the spot image of the CRT on the face of CRT 31 for each binary zero in wave train 13. To provide zero numerical indications that are not perfectly circular but are slightly elliptical with a smaller horizontal axis than vertical axis, the amplitude of the 10 kc. phase shifted signal derived by amplifier 41 is slightly less than the amplitude of the 10 kc. signal at the output of amplifier 42. Thereby, vertical deflection of the CRT spot image is slightly greater than the horizontal deflection to provide a zero having the desired shape.

To enable a complete zero or one to be written onto each position of the face of CRT 31, oscillator 45 must have a frequency equal at least to the bit rate of waveform 13. It is preferred, however, for the oscillator frequency to be approximately 10 times greater than the waveform bit rate to enable an easily read visual indication to be derived from the display.

Figure 4:
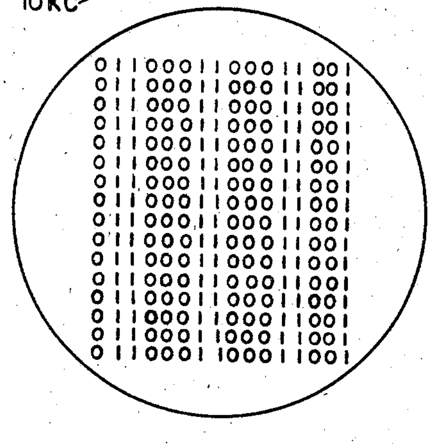
FIGURE 4 is a pictorial representation of a complete data frame presented by the cathode ray tube of FIGURE 1.

It is necessary for the peak-to-peak voltage applied to amplifiers 41 and 42 by oscillator 45 to have a voltage not greater than each step in the output of converters 37 and 38. This constraint prevents overlap of adjacent data bits along each line and between the several lines. In actual practice, however, it has been found that the peak-to-peak voltage applied to amplifiers 41 and 42 is preferably not more than one-half each step derived from converters 37 and 38. By maintaining the sinusoidal character writing voltages less than one-half of each step, adequate separation between adjacent zeros and ones on the display is derived, as indicated by FIGURE 4.

Figures 3A, 3B, 3C, 3D:
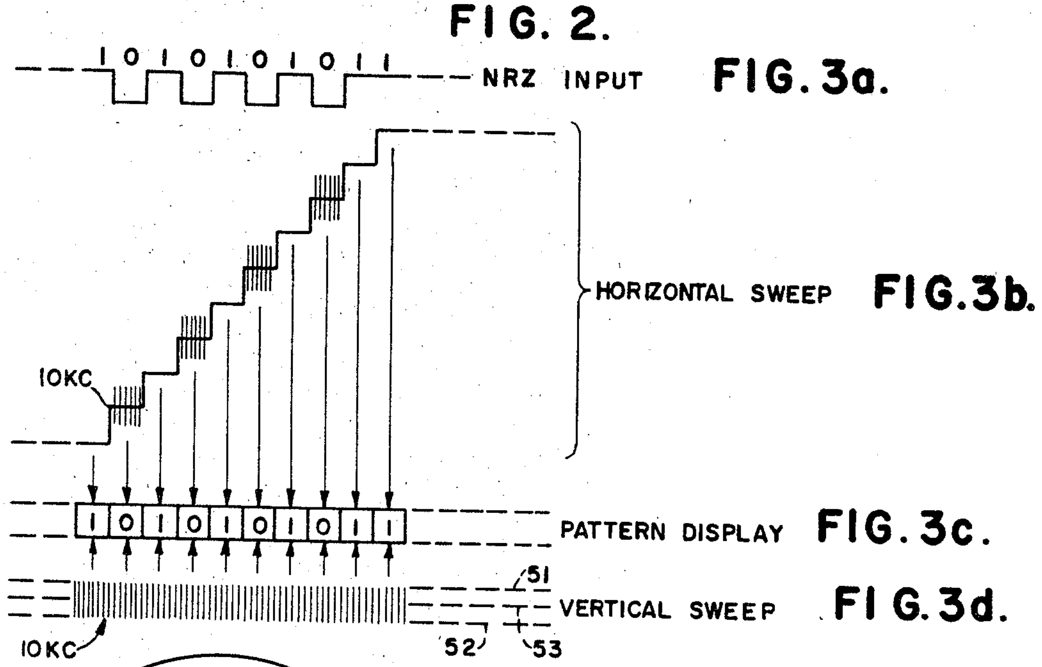
FIGURES 3A–3D are waveforms indicating the relationship between signal voltages applied to the cathode ray tube of FIGURE 1 and received data.

To provide a better and more complete understanding of the manner in which the present invention functions, reference is made to the waveforms indicated by FIG- URES 3A–3D. In FIGURE 3A, the non-return-to-zero waveform being monitored is assumed to be 1010101011. It is further assumed that this input is displayed on a single line on the face of CRT 31, whereby the 10 kc. output of oscillator 45, FIGURE 3D, continuously sweeps the unblanked cathode ray beam of CRT 31 between lines 51 and 52 about the centerline defined by one of the steps at the output of converter 38. In response to each step at the output of converter 37, the cathode ray beam of CRT 31 is positioned in the center of each of the 16 horizontal positions along the face of CRT 31.

For the first binary one bit indicated for the NRZ input of FIGURE 3A, gate 47 remains closed and the cathode ray beam is not horizontally deflected as indicated in FIGURE 3B. The beam is deflected vertically (FIGURE 3D), however, in response to the voltage applied to amplifier 42 by oscillator 45 and a line is written upwardly and downwardly 10 times, as indicated by FIGURE 3C.

When the next bit in the NRZ wave train being monitored occurs, the output of converter 37 steps the beam of CRT 31 one place to the left, as indicated by the step in the FIGURE 3B waveform. The second bit in the NRZ wave train, FIGURE 3A, has a binary zero value, whereby gate 47 is opened. The 10 kc. output of oscillator 45 is thereby fed, after being phase shifted 90°, to the X deflection input 32 of CRT 31, as indicated by FIGURE 3B. The phase shifted input to amplifier 41 translates the cathode ray beam horizontally about the center position defined by the output of converter 37. Since the cathode ray beam is translated horizontally and vertically at the same frequency, 10 kc., FIGURES 3B and 3D, a numerical zero is written onto the face of CRT 31 for the second bit in the binary wave train, as indicated by FIGURE 3C.

In the manner described, and from FIGURES 3A–3D, the maner in which binary ones and zeros are written onto the face of CRT 31 for each of the 256 bit positions recirculating in register 15 is believed obvious. Because of the recirculating nature of the date propagating through register 15, the same data are written repeatedly at each of the 256 bit positions on the CRT face and persistence of vision is maintained with a conventional cathode ray tube.

While a recirculating system may be employed as described and illustrated, it is to be understood that data from source 16 can be coupled directly in a serial manner to gate 47 over a 256 bit frame, without the necessity for recirculation apparatus, if a storage tube is employed in substitution for the conventional CRT illustrated. A storage tube has means included therein for providing persistence of vision to any visual indication derived. An advantage of the storage tube over the recirculating system is that the numerical display can be retained while repeatedly feeding the same wave train through gate 46 for another 256 bit frame. By comparing the repeated displays thereby derived on the face of CRT 31, bit errors in the wave trains are detected.

According to still another modification of the invention, recirculating register 15 can be eliminated and a photograph taken with high speed film of the data written onto the face of CRT 31 over a 256 bit frame. The high speed photographic film is exposed throughout the 256 bit frame to provide a visual indication of the binary signals in wave train 13.

While we have described and illustrated one specific embodiment of our invention, it will be clear that variations of the details of construction which are specifically illustrated and described may be made therein without departing from the true spirit and scope of the invention as defined in the appended claims.

We claim:

1. A system for displaying binary zeros and ones in a bilevel constant frequency train of bits comprising:

(a) a cathode ray tube display having a single unblanked cathode ray beam;

(b) a first stair step generator advanced in response to each of said bits;

(c) a second stair step generator advanced in response to a predetermined number of said bits, each of said stair step generators comprising a counter and a digital to analog converter coupled to said counter, the counter of each generator having the same maximum count;

(d) means for feeding the last count of the counter of the first generator to the input of the counter of the second generator to advance the second counter, whereby said first generator is reset to its lowest step while said second generator is advanced;

(e) an oscillation source deriving a signal at a predetermined frequency equal at least to said constant frequency;

(f) means for linearly combining the output of said oscillator at frequency $f$ and phase $\phi$ with the output of one of said generators to derive a first combined voltage;

(g) means for deflecting said beam in a first direction in response to said first combined voltage;

(h) means for deflecting said beam in a second direction at right angles to said first direction in response to a second voltage;

(i) means for selectively linearly combining the output of said oscillator at frequency $f$ and phase $\phi \pm 90°$ with the output of said other generator to derive said second voltage, said last named means including a 90° phase shifter responsive to said oscillator and a gate responsive to said train to pass the phase shifter output in response to each bit having a zero level and to block the phase shifter output in response to each bit having a one level;

(j) and, wherein said frequency $f$ being at least equal to the constant frequency, and the oscillator outputs combined with the generator outputs having peak-to-peak magnitudes less than each step of both generators.

2. The system of claim 1 wherein each of said means for deflecting includes means for limiting the spot deflection to an extent less than the separation between adjacent ones of said locations in both the X and Y coordinate directions.

3. The system of claim 1 wherein $f$ is approximately ten times the constant frequency.

4. The system of claim 1 wherein $1/f$ is not greater than the interval said display is located at each discrete location.

References Cited

UNITED STATES PATENTS

| | | | |
|---|---|---|---|
| 3,140,473 | 7/1964 | Gaffney | 340—324 X |
| 3,283,317 | 11/1966 | Courter | 340—324 |
| 3,404,394 | 10/1968 | Bassett | 315—24 X |

RODNEY D. BENNETT, Jr., *Primary Examiner.*

T. H. TUBBESING, *Assistant Examiner.*

U.S. Cl. X.R.

315—26; 340—324